United States Patent [19]

Bertling et al.

[11] Patent Number: 4,640,555
[45] Date of Patent: Feb. 3, 1987

[54] SYSTEM AND METHOD FOR SUPPLYING FLUID UNDER PRESSURE FOR A VEHICLE BRAKE SYSTEM

[75] Inventors: Hannes Bertling, Vaihingen; Heinz Leiber, Oberriexingen, both of Fed. Rep. of Germany

[73] Assignee: Robert Bosch GmbH, Stuttgart, Fed. Rep. of Germany

[21] Appl. No.: 765,082

[22] Filed: Aug. 13, 1985

[30] Foreign Application Priority Data

Sep. 27, 1984 [DE] Fed. Rep. of Germany ....... 3435435
Mar. 26, 1985 [DE] Fed. Rep. of Germany ....... 3510910

[51] Int. Cl.$^4$ ............................ B60T 8/02; B60T 13/14
[52] U.S. Cl. ..................................... 303/10; 188/358; 303/11
[58] Field of Search .................................. 303/10-12, 303/50-56, 116, 119, 114, 100, 2-4, DIG. 1, DIG. 2, DIG. 3, DIG. 4; 188/358-359, 352; 60/545, 547.1, 430, 431, 435, 445, 486

[56] References Cited

U.S. PATENT DOCUMENTS

| 3,836,206 | 9/1974 | Leiber | 303/10 |
| 4,273,387 | 6/1981 | Höfer et al. | 303/10 |
| 4,357,054 | 11/1982 | Leiber | 303/10 |
| 4,402,554 | 9/1983 | Belart | 303/116 X |

FOREIGN PATENT DOCUMENTS 3315731 10/1984 Fed. Rep. of Germany .
3323500 1/1985 Fed. Rep. of Germany .

Primary Examiner—Douglas C. Butler
Attorney, Agent, or Firm—Edwin E. Greigg

[57] ABSTRACT

A system for supplying fluid under pressure for a motor vehicle brake system having a pressure supply system including which has a pump, a pressure reservoir, a reservoir pressure switch connected to the pressure reservoir for switching the pump on and off, and a check valve disposed following the pump, and a brake control valve connected to the pump and the pressure reservoir for directing fluid braking pressures into at least one brake circuit which has at least one wheel brake. Between the pressure reservoir and the brake control valve, there is a second check valve through which the pressure reservoir supplies the brake control valve with a pressure medium when the pump is not operating. If the pressure in the pressure reservoir has dropped, because of a withdrawal of pressure medium from it, to such a level that the pressure switch switches the pump on, then the pressure reservoir is not filled by the pump until a pressure is available to the brake control valve which is sufficient for forceful braking, for instance full braking when the brake linings are heated. To this end, a pressure reservoir filling valve is disposed between the pump and the pressure reservoir and is normally closed; this valve is not switched into its open position, via a pressure control inlet, until the above-mentioned predetermined pressure is attained before the brake valve.

15 Claims, 5 Drawing Figures

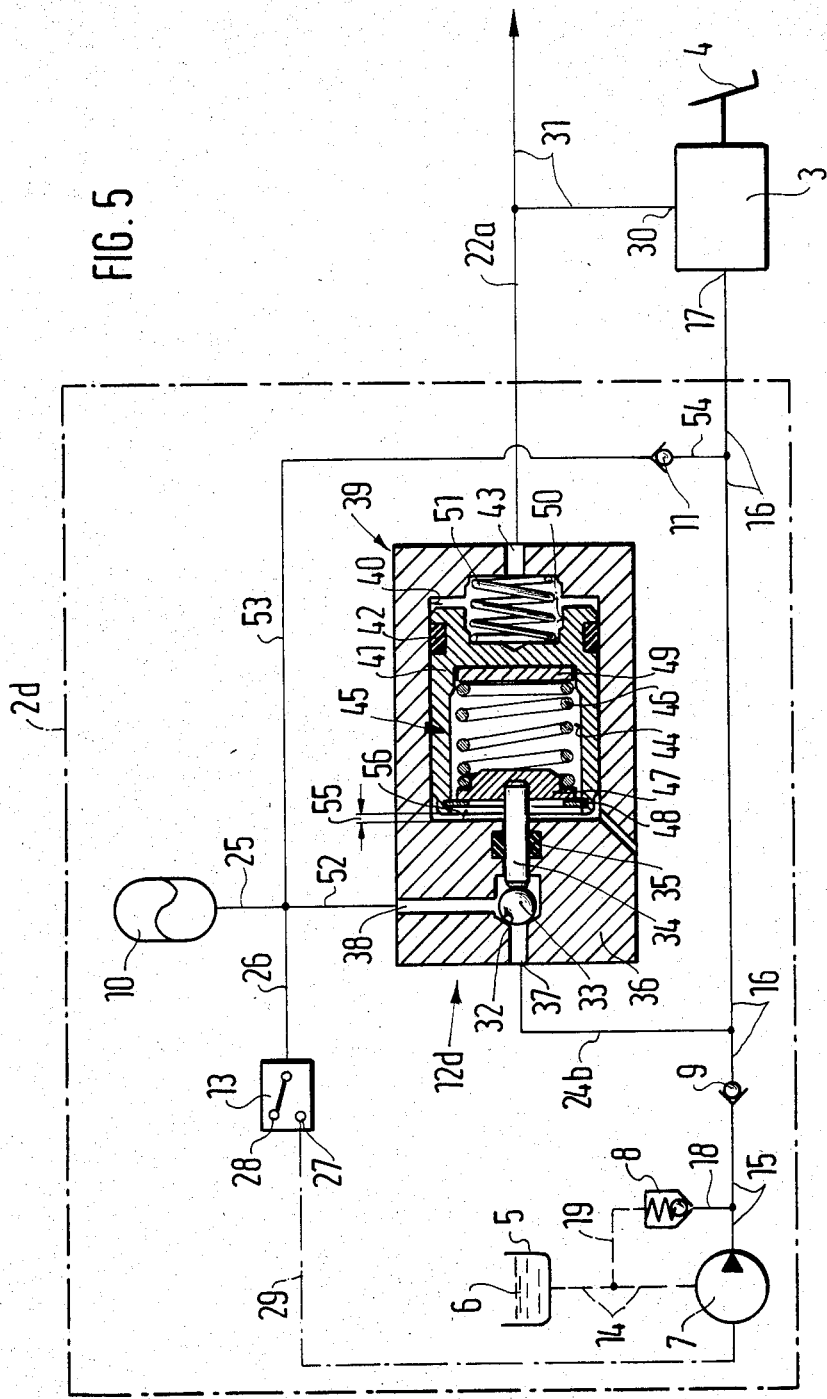

SYSTEM AND METHOD FOR SUPPLYING FLUID UNDER PRESSURE FOR A VEHICLE BRAKE SYSTEM

BACKGROUND OF THE INVENTION

The invention is directed to a system for supplying fluid pressure to a vehicle brake system. Such vehicle brake systems are known. The pressure reservoir of such a vehicle brake system is generally embodied large enough that it can furnish a sufficient amount of pressure medium at sufficiently high pressure to enable full braking with cold brakes, even if the pressure within the pressure reservoir has dropped to near the pressure threshold at which the pump is operating. Initiating a full braking may accordingly trigger the switching on of the pump, which fills the reservoir, causing the pressure at the inlet of the brake valve to rise. Since in full braking initiated at very high speed a considerable loss in friction may occur due to heating of the brake linings, the brake pressure must be increased accordingly. To this end, after the pump has been switched on, a rapid rise in the pressure is required at the inlet of the brake valve, up to a pressure which may be considerably above the pressure threshold for switching on the pump. The pump must have a capacity such that it can fill the pressure reservoir rapidly enough up to this higher pressure. Especially when the pressure reservoir selected is so large that several partial brakings are possible without the aid of a pump, a high-capacity, expensive pump is needed in prior art systems and such a pump has the disadvantage of requiring a powerful supply of electric current for its electric motor. If the vehicle brake system is equipped with anti-skid control valves for repeatedly reducing the brake pressure, then the pump must furthermore also be capable of re-supplying the brake valve with the quantities of pressure medium bled from the brake cylinders during the brake pressure reduction. This further increases the weight and the price of the pump.

OBJECT AND SUMMARY OF THE INVENTION

The method in accordance with the invention for operating a vehicle brake system and the vehicle brake system have the advantage that smaller and accordingly less expensive pumps are sufficient for increasing the supply pressures at the inlets of the brake valves sufficiently quickly. In the vehicle brake system defined herein, the pressure reservoir is not filled until the supply pressure at the inlet of the brake valve has exceeded a pressure level which is sufficient for braking with heated brake linings. Also, in the vehicle brake system, the filling of the pressure reservoir begins at low pump pressures, so that less energy is required and there is also less strain on the pump. A further advantage of the vehicle brake systems according to the invention is that the pressure thresholds for switching the pumps on and off can be set farther apart from one another than was previously possible, so that smaller and lighter pressure reservoirs and smaller pressure medium supply containers can be installed.

By means of the provisions recited herein, advantageous further developments of and improvements to the vehicle brake systems disclosed are possible.

The characteristics set forth can also be used in combination in the same vehicle brake system. This has the advantage that filling of the pressure reservoir takes place relatively early and quickly. Energy losses, such as could otherwise occur during braking in flowing through a pressure limiting valve installed for safety reasons in the vehicle brake system are thereby avoided.

A further embodiment has the advantages that on the one hand with an unactuated brake control valve, the pump needs merely to overcome a pressure that is insignificantly higher than the pressure available in the pressure reservoir, and that on the other hand with the brake valve actuated, the pressure reservoir is not filled until a pump pressure that is at least sufficient for full braking has been attained upstream of the brake valve. As a result, this embodiment combines the advantages of the vehicle brake systems with that of low engineering expense. The invention sets forth space-saving characteristics and at the same time relatively inexpensive exemplary embodiments. The characteristic features have the effect that when braking is initiated only a negligibly small quantity of pressure medium flows into the cylinder, with the advantage that rapid braking pressure increases are possible.

The invention will be better understood and further objects and advantages thereof will become more apparent from the ensuing detailed description of preferred embodiments taken in conjunction with the drawings.

BRIEF DESCRIPTION OF THE DRAWINGS

FIG. 5 shows a fifth exemplary embodiment of the vehicle brake system according to the invention.

DESCRIPTION OF THE PREFERRED EMBODIMENTS

Figure 1:
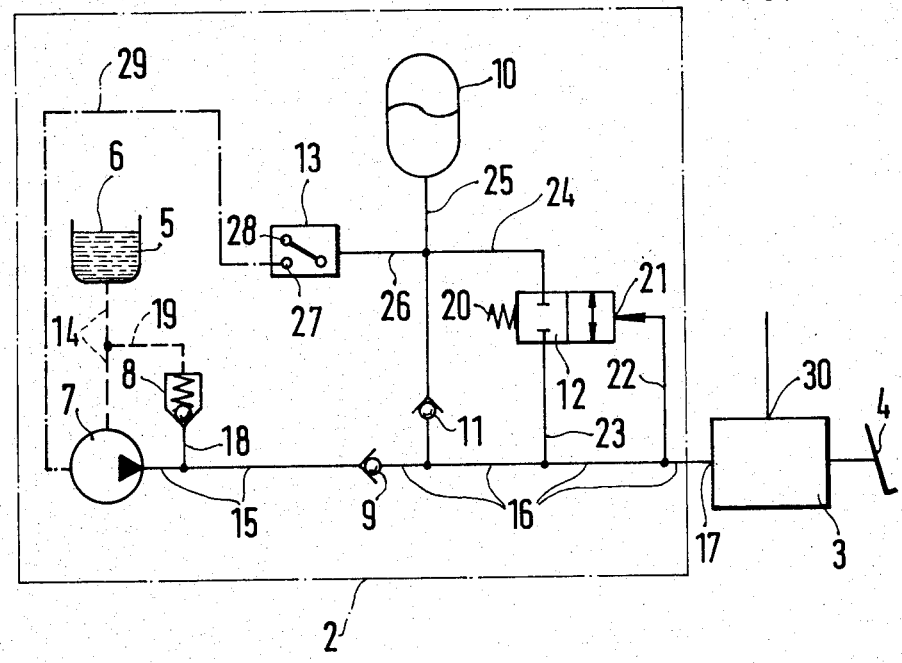
FIG. 1 shows a first exemplary embodiment of a vehicle brake system according to the invention.

The first exemplary embodiment of a vehicle brake system as shown in FIG. 1 has a presssure supply device 2, including a main brake control valve 3 and at least one brake circuit, not shown, with wheel brakes that are supplied with brake pressure either directly by the brake valve 3 or via a brake booster, not shown, controlled by this brake valve. For controlling the brake pressure, a brake pedal 4 is associated with the main brake control valve 3.

The pressure supply 2 has a supply container 5 for pressure medium 6, a pump 7, a pressure limiting valve 8, a one-way check valve 9, a pressure reservoir 10, a second one-way check valve 11, a pressure reservoir filling control valve 12 and a reservoir pressure switch 13 that includes contact 27 and 28. Contact 28 is connected by electrical line 29 with the pump motor of pump 7.

The pump 7 has a motor, not shown, and is connected to the supply container 5 via a line 14. A pressure line 15 leads to the one-way check valve 9. A line 16 begins at this check valve 9 and ends at an inlet 17 of the brake valve 3. A line 18 to which the pressure limiting valve 8 is connected branches off from the line 15. From the pressure limiting valve 8, a return flow line 19 leads to the fluid supply line 14. The pressure reservoir filling valve 12 is embodied as a pressure-controlled 2/2-way valve and has a closing spring 20 and a pressure control inlet 21. The pressure control inlet 21 is connected via a control line 22 to the line 16. A line 23 also communicates with the line 16 and leads to the pressure reservoir filling valve 20. From the filling valve 20, a filling line 24 leads via a further line 25 to connect the pressure reservoir 10 with the pressure reservoir filling valve 12. The second check valve 11 is located between the line 25 and the line 16 and the check valve 11 opens in the direction of the line 16 away from the pressure reservoir. The pressure switch 13 is connected to the line 25 via a line 26. The reservoir pressure switch 13 has contacts 27, 28, known per se, which are adjusted such that via an electric lead 29, the pump 7 is switched on below a preselected lower pressure threshold and is switched off when a second predetermined upper pressure threshold is reached. The pressure reservoir filling valve 12 is embodied or adjusted such that it is closed when the vehicle brake system has no pressure and opens only if a pressure is present at its pressure control inlet 21 that is higher than the above-mentioned lower pressure threshold and lower than the above-mentioned upper pressure threshold.

MODE OF OPERATION OF THE FIRST EXEMPLARY EMBODIMENT

When a motor vehicle in which the vehicle brake system shown in FIG. 1 has been installed is started, the pressure prevailing in the pressure reservoir 10 is at first so low that the reservoir pressure switch 13 switches the pump 7 on. As a result, the pump 7 pumps pressure medium 6 from the supply container 5 into the line 15 and through the check valve 9, which opens in the direction of the brake valve 3, counter to the second check valve 11, and into the line 23 and the control line 22. As a result of the described embodiment of the pressure reservoir filling valve 12, a pressure rise takes place in the line 16, at least so long as the brake valve 3 is not actuated. This pressure rise continues, because the pressure reservoir filling valve 12 is closed. Finally, the pressure at the pressure control inlet 21 of pressure reservoir filling valve 12 reaches the level that suffices for opening the pressure reservoir filling valve 12 counter to the force of the closing spring 20. As a result, pressure medium flows through the line 23, the filling line 24 and the line 25 into the pressure reservoir 10, so that a pressure rise takes place in the pressure reservoir 10, as well. Finally, the pressure in the pressure reservoir and line 26 reaches the above-mentioned upper pressure threshold, and the reservoir pressure switch 13 switches the pump 7 off. In the event of a defect in the pressure switch 13, the pressure limiting valve 8 prevents the destruction of the pump 7 or pressure reservoir 10.

If the pedal 4 is actuated once or more than once in order to effect partial braking, then with the pump 7 switched off, pressure medium 6 flows out of the pressure reservoir 10 through the line 25, through the second check valve 11 to the line 16 and into the brake valve 3 and leaves this valve 3 at an outlet 30 in the direction of the wheel brake cylinder, not shown. The result causes a drop in the pressure in the pressure reservoir 10, for instance down to a pressure which is just slightly above the lower pressure threshold for switching the pump on. If full braking is now initiated via the brake pedal 4, then the pressure suddenly drops below the pressure threshold, so that the pump 7 is switched on by pressure switch 13. The size of the pressure reservoir 10 and/or the level of the lower pressure threshold is selected such that the pressure still available when the pump 7 is switched on is sufficient to attain the maximum possible braking decelerations on a gripping road surface with cold wheel brakes. At this pressure, the pressure reservoir filling valve 12 is closed. Because the second check valve 11 can be opened only in the direction of the brake valve 3, the capacity of the pump 7 is exploited fully for generating a rapid pressure rise at the inlet 17 of the brake valve 3. If the brake linings in the wheel brakes should have become heated because of this severe braking deceleration, causing a loss of friction, then by actuating the brake pedal 4 more forcefully the brake valve 3 can be controlled such that a pressure increase occurs at its outlet 30, thereby compensating for the loss of friction. The pressure beyond which the pressure reservoir filling valve 12 is controlled into the open position via its pressure control inlet 21, and the size of the wheel brake cylinders disposed in the wheel brakes, are matched to one another such that the opening of the pressure reservoir filling valve 12 does not occur until such time as a brake pressure sufficient for locking of the hot wheel brakes on a very gripping road surface has been attained. As a result, the pump 7 is used primarily, in the intended manner, for generating braking pressure. Only excess capacity of the pump 7 is used for filling the pressure reservoir 10 with supply pressure. As a result, the pump 7 can be relatively small and accordingly inexpensive. The described principle of embodying the pressure supply device 2 is also applicable if anti-skid valves of a known type, not shown, are disposed between the brake valve 3 and the wheel brakes, not shown. In this case, naturally the capacity of the pump 7 must be increased, so that the pump furnishes the brake valve 3 with those quantities of pressure medium that have been withdrawn from the wheel brakes because of the actuation of the anti-skid valves.

Figure 2:
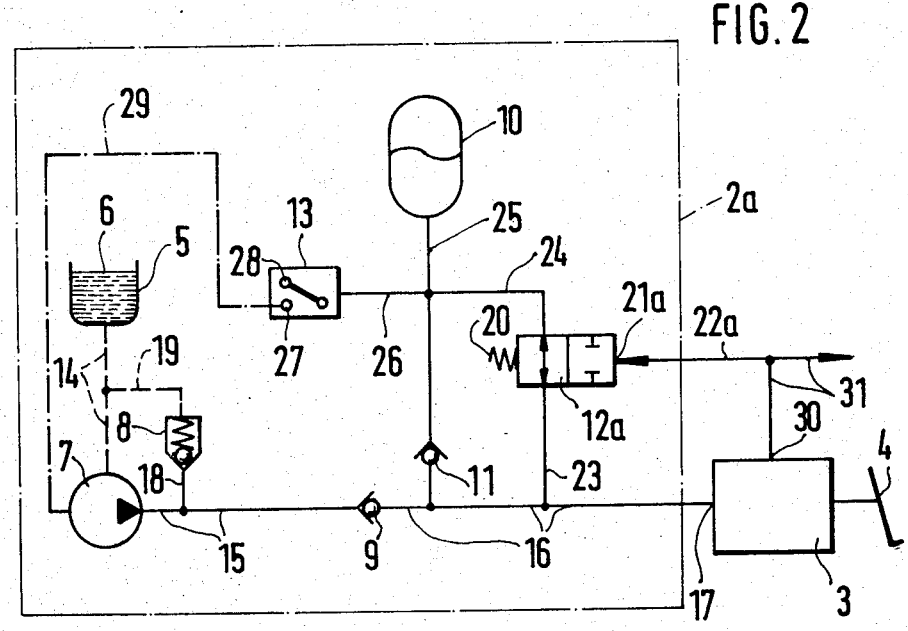
FIG. 2 shows a second exemplary embodiment of the vehicle brake system.

The second exemplary embodiment according to FIG. 2 has a pressure supply device 2a and likewise has a brake valve 3 and a brake pedal 4.

The pressure supply device 21 likewise includes a supply container 5 for pressure medium 6, a pump 7, a pressure limiting valve 8, a check valve 9, a pressure reservoir 10, a second check valve 11, a reservoir pressure switch 13, lines 14, 15, 16, 18, a return flow line 19, a supply line 23, a filling line 24, a supply-pressure line 25, a pressure line 26, control switch 13 with contacts 27, 28 and an electric lead 29. Between the line 23 and the filling line 24, a pressure reservoir filling control valve 12a is inserted. This control valve is embodied as a 2/2-way normally open valve and has an opening spring 20 and a pressure control inlet 21a. The pressure control inlet 21a communicates with an outlet 30 of the brake valve 3 via a control line 22a and a line 31. The line 31 leads for example to booster cylinders, not shown, of a brake booster or to wheel brake cylinders, also not shown. Between the brake valve 3 and the wheel brake cylinders, known anti-skid control valves may again be installed. In its basic position, as already indicated by the designation of the opening spring 20, the pressure reservoir charge control valve 12a is opened. Supplying control pressure to the pressure control inlet 21a has the effect, such that when the control pressure is sufficiently high, of compressing the opening spring 20 and switching the pressure reservoir filling valve 12a into the blocking position such that no fluid is directed from the pump to the pressure reservoir. The opening spring 20 is for example embodied such that the switchover in to the blocking position is effected by a control pressure of for instance 30 bar below the pressure threshold below which the reservoir pressure switch 13 switches the pump 7 on.

MODE OF OPERATION OF THE SECOND EXEMPLARY EMBODIMENT

When a motor vehicle in which the pressure supply device 2a has been installed is started, the pump 7 is switched on by means of the reservoir pressure switch 13 if the pressure reservoir 10 has been emptied to below the lower pressure threshold. The pump 7 pumps pressure medium 6 through the line 15 and the check valve 9 into the line 16, so that the pressure medium reaches both the inlet 17 of the brake valve 3 and the line 23 and from there reaches the pressure reservoir filling valve 12a. As long as the brake valve 3 is not actuated, no pressure medium flows through it to its outlet 30 and on into the line 31. Therefore no significant pressure can prevail in this line 31. As a result, the pressure reservoir filling valve 12a does not receive any control pressure via its pressure control input 21a, which control pressure would move the pressure reservoir filling valve 12a out of its open position shown, which is dictated by the opening spring 20a, and into the blocking position. When the brake valve 3 is not being actuated, the pumping capacity of the pump 7 therefore remains fully and completely available for filling the pressure reservoir 10 through the filling line 24 and the line 25. If an upper pressure threshold is attained in the pressure reservoir 10, then the pressure switch 13 switches the pump 7 off.

If after the pressure reservoir 10 has been filled in the described manner the brake valve 3 is actuated by means of the brake pedal 4, then pressure medium 6 flows out of the outlet 30 into the line 31, and in this line a pressure arises, the level of which is dependent on the manner of actuation of the brake pedal 4. When the brake pedal 4 is actuated lightly, the pressure arising in the line 31 will be below the response threshold of the pressure reservoir filling valve 12a. The result is that the pressure reservoir filling valve 12a remains open. The pressure medium required for building up that pressure flows to the brake valve 3 from the pressure reservoir 10 through the line 25, the check valve 11 and the line 16, as well as through the pressure reservoir filling valve 12a, which is open. If by means of the brake pedal 4, a pressure is directed into the line 31 which is above the response threshold of the pressure reservoir filling valve 12a, then this valve switches over into its blocking position. As a result, so long as the pressure reservoir 10 contains a pressure that is above the lower pressure threshold, beyond which the pump 7 is switched on, pressure medium reaches the brake valve 3 solely through the check valve 11. If the pressure supply in the pressure reservoir 10 is exhausted to below the lower pressure threshold because of repeated forceful actuations of the brake pedal 4, then the reservoir pressure switch 13 switches the pump 7 on and pumps pressure medium in to the line 16. If during the operation of the pump 7 a pressure is directed into the line 31 by means of the brake pedal 4 which is below the response threshold of the pressure reservoir filling valve 12a, then the pump 7 simultaneously supplies the brake valve 3 and the pressure reservoir 10 with pressure medium. By means of a more forceful actuation of the brake pedal 4, a pressure is directed into the line 31 which exceeds the response threshold of the pressure reservoir filling valve 12a and switches this valve into its blocking position. As a result, the entire pumping capacity is available for building up braking pressure in the wheel brake cylinders. The pressure just before the inlet 17 of the brake valve 3 finally increases to such a high level that the pressure limiting valve 8 connected to the line 18 opens and prevents any further pressure rise. If the pressure in the line 31 is reduced by means of the brake pedal 4, for instance by ending a particular braking, then the opening spring 20a presses the pressure reservoir filling valve 12a into its open position, causing the pump 7 to fill the pressure reservoir 10. Thus the pressure reservoir filling valve 12a assures that the pressure reservoir 10 will be filled only at such times as a high pressure for braking is not required in the line 31. As a result, a desired braking pressure, for instance for full braking, is quickly attained in the wheel brake cylinders even when the pressure reservoir 10 has been largely emptied, and even if the pump 7 later requires a relatively long time to fill the reservoir 10.

The pressure reservoir filling valve 12 of the first exemplary embodiment may also be used in the pressure supply device 2a. This has the advantage that the closing of the reservoir pressure filling valve 12a during full braking does not bring about the opening of the pressure limiting valve 8. Such an opening would consume an unnecessary amount of pump drive energy.

Figure 3:
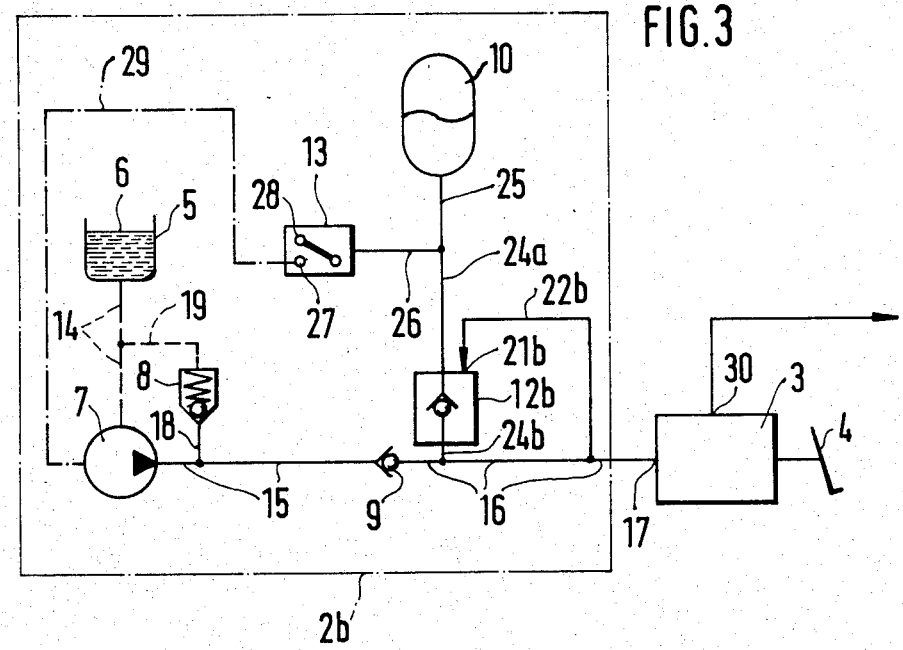
FIG. 3 shows a third exemplary embodiment.
Figure 4:
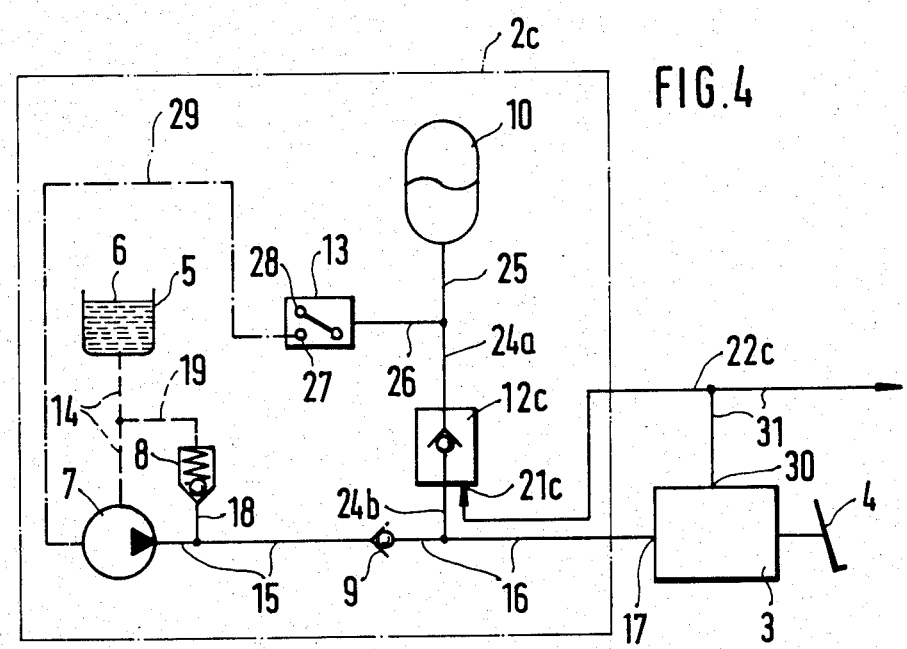
FIG. 4 shows fourth exemplary embodiment.

The exemplary embodiments of pressure supply devices 2b and 2c shown in FIGS. 3 and 4 differ from the exemplary embodiments of FIGS. 1 and 2 in that instead of parallel-connected check valves 11 and pressure reservoir filling valves 12, 12a embodied as 2/2-way valves, so-called controllable check valves 12b and 12c are installed. These controllable check valves 12b and 12c serve to supply the brake valves 3 from the pressure reservoirs 10 and additionally serve as pressure reservoir filling valves; for these purposes, they communicate via filling lines 24a with lines 25, already described, which lead to the pressure reservoirs 10, and via lines 24b with the lines 16, also already described. The pressure reservoir filling valve 12b according to FIG. 3 has a pressure control inlet 21b, which is connected via a control line 22b to the line 16. A pressure rise at the pressure control inlet 21b to above a predetermined pressure level causes an opening of the pressure reservoir filling valve 12b. The pressure reservoir filling valve 12c according to FIG. 4 has a pressure control inlet 21c, which is connected via a control line 22c to the above-described line 31. The pressure reservoir filling valve 12c is normally open and performs its check valve function as soon as a predetermined pressure level is exceeded at its pressure control inlet 21c. The reference numerals taken over from the exemplary embodiments of FIGS. 1 and 2 designate component parts having identical functions.

The fifth exemplary embodiment of a motor vehicle brake system shown in FIG. 5 has a pressure supply device 2d and a brake valve 3 having at least one outlet 30, to which at least one brake circuit, not shown, is connected via a line 31. The brake valve 3 again has an inlet 17 and is actuatable by means of a brake pedal 4.

As described above, the pressure supply device 2d has a supply container 5 for pressure medium 6, a pump 7, a pressure limiting valve 8, a check valve 9, a pressure reservoir 10, a second check valve 11 and a reservoir pressure switch 13, but a differently embodied pressure reservoir filling valve 12d.

The pump 7 again communicates via a line 15, the check valve 9 and a line 16 with the inlet 17 of the brake valve 3. The pump 7 again is supplied with pressure medium 6 from the supply container 5 via a line 14. Via a line 18, the pressure limiting valve 8 is connected to the line 15, and when this valve 8 opens it directs pressure medium back to the pump 7, via a return flow line 19 and finally the line 14.

The pressure reservoir filling valve 12d is embodied as a seat valve and has a valve seat 32, a valve closure ball 33, a closing tappet 34 and a sealing ring 35. These individual parts 32–35 are disposed in a housing 36, which has an inlet 37 and an outlet 38, in such a way that the pressure reservoir filling valve 12d can experience a flow through it from its inlet 37 in toward its outlet 38 in the manner of a check valve.

By means of a closing device 39, which is associated with the closing tappet 34, the valve ball 33 can be moved against the valve seat 32 via this closing tappet 34. To this end, the closing device 39 comprises a cylinder 40, which is molded onto the housing 36; a piston 41, which is displaceable within this cylinder 40; and a sealing ring 42, which is displaceable along the cylinder 40. The diameter of the closing tappet 34 is selected such that it is substantially equal to the diameter of the valve seat 32. The diameter of the cylinder 40 is substantially larger than the diameter of the closing tappet 34. The cylinder 40 is disposed coaxially with the closing tappet 34 and has a control connection 43, which communicates via a control line 22a and the line 31 with the outlet 30 of the brake valve 3.

Adjacent to the closing tappet 34, the piston 41 has a hollow chamber 44, which receives a closing force limiter 45. The closing force limiter 45 comprises a closing force limiting spring 46, a spring plate 47, a stop ring 48 and a compensation disk 49. The stop ring 48 is secured to the piston 41 near the end thereof that is nearer the closing tappet. Toward the control connection 43, the spring plate 47 that is displaceably disposed in the hollow chamber 44 adjoins the stop ring 48. Adjacent to the spring plate 47 in turn is the closing force limiting spring 46. The compensating disk 49 is inserted between the closing force limiting spring 46 and the piston 41. The closing force limiting spring 46 is installed in the piston 41 in a prestressed state. The compensating disk 49 is selected such that its thickness, together with the tolerance-dictated length of the closing force limiting spring 46, has a predetermined prestressing force, when the spring plate 47 is resting on the stop ring 48. On the opposite end from the hollow chamber 44, the piston 41 has an additional hollow chamber 50, into which a closing spring 51 extends. The closing spring 51 is embodied as substantially less rigid and with less prestressing than the closing force limiting spring 46 and it acts in the direction of the valve seat 32.

The line 16 is tapped and connected via a filling line 24b with the input 37 of the pressure reservoir filling valve 12d. From the outlet 38, a line 52 and, joining it, a line 25 leads to the pressure reservoir 10. The pressure switch 13 is in turn connected via a line 26 with the line 25. A pressure reservoir outlet line 53 is connected to the line 25 and leads to the second check valve 11, which communicates via a line 54 with the line 16 and opens in the direction of line 16. The pressure switch 13 again includes contacts 27 and 28 for switching the pump 7 on and off via an electric lead 29.

MODE OF OPERATION OF THE FIFTH EXEMPLARY EMBODIMENT

When the pump 7 is off and the brake pedal 4 is not being actuated, the individual parts of the pressure reservoir filling valve 12d are located in the alignments shown. These alignments are effected by the closing spring 51, which urges the piston 41 toward the valve seat 32 and thereby presses the closing tappet 34, via the closing force limiter 45 and its spring plate 47, against the valve ball 33 and so presses the valve ball 33 in turn against the valve seat 32. As already described, the closing spring 51 is soft in embodiment, so that although the valve ball 33 is reliably placed against the valve seat 32, it can still be raised from the valve seat 32 by a low pressure in the inlet 37, while the pressure reservoir 10 is still empty. With the pressure reservoir filling valve 12d closed and the inlet 43 lacking pressure, the piston 41 is spaced apart by only a slight distance 55 from an end face 56 which defines the cylinder 40 in the direction of the pressure reservoir filling valve 12d.

If the pump 7 is switched on and the brake pedal 4 remains unactuated, pressure medium 6 from the supply container 5 flows through the lines 15 and 24b to reach the inlet 37, where it produces a pressure rise. As already noted, when the pressure reservoir 10 is empty even a slight pressure in the inlet 37 suffices to raise the valve ball 33 from its valve seat 33. As a result, pressure medium flows through the pressure reservoir filling valve 12d and through its outlet 38 and the lines 52 and 25 into the pressure reservoir 10. The pressure that is established in the pressure reservoir 10 acts upon both the pressure switch 13 and the closing tappet 34. Because of the above-mentioned selection of the diameters of the valve seat 32 and the closing tappet 34, the latter simultaneously serving as a pressure equalizing piston, the pressure reservoir filling valve 12d is embodied as an at least substantially pressure-equalized valve, in terms of its outlet 38. In other words, a pressure drop between its inlet 37 and its outlet 38 that is required to open the pressure reservoir filling valve 12d is substantially independent of the pressure prevailing in the pressure reservoir 10. If the pressure in the pressure reservoir 10 has risen sufficiently, then the pressure switch 13 switches the pump 7 off. If the brake pedal 4 is activated now, then braking can be accomplished with the pressure available in the pressure reservoir 10, initially without the aid of the pump 7. The pressure medium required for this at the inlet 17 of the brake valve 3 flows out of the pressure reservoir 10 through the line 25, the pressure reservoir outlet line 53, the check valve 11 and the line 54 and finally the line 16, so as to reach the brake valve 3.

If pressure is available in the pressure reservoir 10, or if the pump 7 is switched on, then pressure is also available at the inlet 17 of the brake valve 3. If braking pressure is now generated by actuation by means of the brake pedal 4 and is delivered to the brake circuits (not shown) through the outlet 30 and the line 31, then this braking pressure also reaches the cylinder 40, via the control line 22a and the control connection 43, and acts upon the piston 41. As a result of this, the piston 41, because it has a large cross section in comparison with the closing tappet 34, is displaced toward the end face 56 and pressed against it even at relatively low braking pressures. As a result, the entire force of the prestressed closing force limiting spring 46 now acts via the spring plate 47 upon the closing tappet 34, which then urges the valve ball 33 toward its valve seat 32 with considerable force. As a result, the inflow of pressure medium from the pump 7 into the pressure reservoir 10 is initially prevented. This situation prevails until such time as the pump 7 has generated a pressure rise in the line 16 and at the inlet 17 of the brake valve 3 that is sufficient for a full braking in any event. Since during a full braking as well, once the maximum braking pressure has been generated, no further flow of pressure medium through the brake valve 3 is required, the pressure just before the inlet 17 can at first continue to rise. The closing force limiting spring 46 is prestressed such that its force can be overcome by means of the action exerted upon the valve ball 33 by the pressure that exceeds the pressure required for a full braking. As a result, beyond this pressure the valve ball 33 rises from its valve seat 32, so that pressure medium flows into the pressure reservoir 10 and fills it, until the pressure switch 13 switches the pump 7 off. The pressure beyond which the pressure reservoir filling valve 12d opens, is lower than the pressure at which the pressure limiting valve 8, which is intended to protect the pump 7 and the pressure reservoir 10, opens.

From the description of the mode of operation, it will be appreciated that when the brake pedal 4 is unactuated, the pump 7 can fill the pressure reservoir 10 with a minimum of work output, and on the other hand that when braking takes place, a pressure sufficient for full braking is reliably available at the inlet 17 of the braking valve 3, and that for instance during a full braking the pressure reservoir is filled by a surplus capacity of the pump 7, although this is done counter to a higher pressure resistance. This pressure resistance, as will also be understood from the above description, is between the full braking pressure and the pressure beyond which the valve 8 opens. It will be readily appreciated that the functions of the pressure reservoir filling valves 12 and 12a of the first and second exemplary embodiments are perfomed by a single pressure reservoir filling valve 12d. It is apparent that the technical cost of the pressure reservoir filling valve 12d of the fifth exemplary embodiment is only slightly higher than that of each one of the pressure reservoir filling valves 12 and 12a. It should also be noted that the closing spring 51 is not absolutely required for the function of the pressure reservoir filling valve 12d. However, the closing spring 51 does offer the advantage that the spring plate 47, the closing tappet 34, the valve ball 33 and perhaps the valve seat 32 touch one another. As a consequence, if a displacement of the piston 41 toward the end face 56 takes place because of an actuation of the brake pedal 4, only a little pressure medium needs to flow through the control line 22a, so that the majority of the pressure medium that leaves the brake valve 3 through its outlet 30 reaches the wheel brakes, where it effects rapid rises in braking pressure.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A system for supplying fluid under pressure for a motor vehicle brake system, which comprises a pressure supply system, including a fluid supply, a pump and a pressure reservoir that is fillable with fluid by said pump, a brake control valve having an inlet connected to said pressure supply system for controlling braking pressures in at least one brake circuit for at least one wheel brake, a fluid control valve means in said pressure supply system between said pump and said pressure reservoir and connected to a line to said brake control valve, said fluid control means controlling fluid pressure with priority supplying of fluid under pressure to said brake control valve, a pressure control switch for controlling said pump to supply fluid under pressure to said brake control valve and to said pressure reservoir in order to fill said pressure reservoir to a predetermined pressure and to shut off said pump when said predetermined pressure has been reached in said pressure reservoir whereby said pressure reservoir supplies fluid under pressure to said brake control valve until a predetermined low pressure has been reached wherein said pressure control switch starts said pump.

2. A system for supplying fluid under pressure for a motor vehicle brake system as defined by claim 1, wherein said pressure supply system includes a check valve in a pressure line between said pressure reservoir and said brake control valve which opens toward said brake control valve and which bypasses said fluid control valve and said fluid control valve means includes a pressure control that closes said fluid control valve means whenever said pump is not in operation and the pressure reservoir has reached a predetermined pressure and opens said fluid control valve means when said pump is in operation to permit fluid flow to said reservoir.

3. A system for supplying fluid under pressure for a motor vehicle brake system as defined by claim 2, wherein said fluid control valve means is embodied as a 2/2-way valve and has a closing spring and a pressure control inlet, and that the pressure control inlet is connected to a fluid pressure line which is disposed between said pump and said brake control valve.

4. A system for supplying fluid under pressure for a motor vehicle brake system as defined by claim 1, wherein said fluid control valve means is embodied as a pressure-check valve controllable in accordance with pressure.

5. A system for supplying fluid under pressure for a motor vehicle brake system as defined by claim 4, wherein said pressure-check valve has a pressure control inlet, which communicates with the inlet of the brake control valve.

6. A system for supplying fluid under pressure for a motor vehicle brake system comprising a pressure supply system including a fluid supply, a pump and a pressure reservoir that is fillable with fluid under pressure by said pump, a brake control valve having an inlet connected to the pressure supply system for controlling braking pressures in at least one brake circuit for at least one wheel brake, a fluid control valve means in said pressure supply system between said pump and said pressure reservoir and connected to a line to said brake control valve, a fluid pressure line connected from an outlet of said brake control valve from an outlet of said brake control valve to said control valve means, said control valve means arranged to supply fluid under pressure from said pressure reservoir to said brake control valve when said pump is shut off and conversely when said pump is switched on said control valve means is adapted to fill said pressure reservoir, as long as a pressure prevailing at said outlet of said brake control valve is below a predetermined level, and a pressure switch connected to said pump for controlling said pump at a predetermined pressure level in said pressure reservoir.

7. A system for supplying fluid under pressure for a motor vehicle brake system as defined by claim 6, wherein said fluid control valve means includes a check valve between said pressure reservoir and said brake control valve openable toward the brake control valve and a pressure reservoir filling valve which bypasses said check valve and is controllable in accordance with pressure, whereby said filling valve is closable whenever a pressure at the outlet of the brake control valve has attained a predetermined level.

8. A system for supplying fluid under pressure for a motor vehicle brake system as defined by claim 7, wherein said pressure reservoir filling valve is embodied as a 2/2-way valve including an opening spring and a pressure control inlet which communicates with the outlet of the brake control valve.

9. A system for supplying fluid under pressure for a motor vehicle brake system as defined by claim 6, wherein said fluid control valve means is embodied as a controllable check valve controllable in accordance with pressure and is disposed such that it opens in order to supply the brake control valve fluid from the pressure reservoir and additionally is kept open until a predetermined pressure level at the outlet of the brake control valve is attained.

10. A system for supplying fluid under pressure for a motor vehicle brake system as defined by claim 9, wherein the controllable check valve has a pressure control inlet which communicates with the outlet of the brake control valve.

11. A system for supplying fluid under pressure for a motor vehicle brake system as defined by claim 7, wherein said pressure reservoir filling valve is embodied as a seat valve through which fluid flows in a direction of said pressure reservoir and has a closing tappet having a diameter effecting a pressure equalization, and a closing device, comprising a cylinder and a piston upon which pressure from the outlet of the brake control valve acts, the diameter of the piston being substantially greater than that of the closing tappet and a closing force limiter inserted between the closing device and the closing tappet.

12. A system for supplying fluid under pressure for a motor vehicle brake system as defined by claim 11, in which said piston has a hollow chamber adjacent the closing tappet in which said closing force limiter is installed, said closing force limiter includes a prestressed closing force limiting spring and a spring plate inserted between said force limiting spring and said closing tappet which spring plate is pressable by said closing force limiting spring against a stop ring secured to the piston.

13. A system for supplying fluid under pressure for a motor vehicle brake system as defined by claim 11, which includes a closing spring that acts counter to said piston and said closing spring is substantially softer and less prestressed than said closing force limiting spring of the closing force limiter.

14. A system for supplying fluid under pressure for a motor vehicle brake system as defined by claim 12, which includes a closing spring that acts counter to said piston and said closing spring is substantially softer and less prestressed than said closing force limiting spring of the closing force limiter.

15. A method for supplying fluid under pressure for operating a motor vehicle brake system which comprises operating a pump to fill a pressure reservoir with fluid to a predetermined pressure and to apply fluid under pressure to a brake control valve during operation of said pump, stopping operation of said pump upon reaching a predetermined high reservoir pressure, and applying fluid under pressure from said pressure reservoir to said brake control valve until a predetermined low pressure is obtained, and starting said pump to apply a fluid under pressure only to the brake control valve until pressure builds up sufficiently to operate a supply control valve between the pressure reservoir and the pump which then adds fluid under pressure from the pump to the pressure reservoir until the prddetermined high pressure is obtained and then stopping the pump until the predetermined low pressure is obtained.

* * * * *